(12) United States Patent
Maruyama

(10) Patent No.: US 6,421,314 B1
(45) Date of Patent: Jul. 16, 2002

(54) SEMICONDUCTOR LASER DRIVE DEVICE, OPTICAL HEAD, OPTICAL DISK DEVICE AND OPTICAL DISK RECORDING AND REPRODUCING METHOD

(75) Inventor: Tsutomu Maruyama, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/394,438

(22) Filed: Sep. 9, 1999

(30) Foreign Application Priority Data

Sep. 10, 1998 (JP) .......................................... 10-257010

(51) Int. Cl.[7] .................................................. G11B 7/00
(52) U.S. Cl. ........................ 369/116; 369/47.5; 369/121
(58) Field of Search ................................. 369/122, 121, 369/116, 47.5, 53.37

(56) References Cited

U.S. PATENT DOCUMENTS

| | | | | |
|---|---|---|---|---|
| 5,386,409 A | * | 1/1995 | Yokota et al. | ............... 369/116 |
| 5,629,913 A | * | 5/1997 | Kaku et al. | ................. 369/116 |
| 5,781,222 A | * | 7/1998 | Yamawaki et al. | ......... 369/116 |

FOREIGN PATENT DOCUMENTS

| | | | | |
|---|---|---|---|---|
| JP | 3-97130 | * | 4/1991 | ................. 369/112 |
| JP | 7-14202 | * | 1/1995 | ................. 369/115 |
| JP | 9-115166 | * | 5/1997 | ................. 369/122 |
| JP | 10-228645 | * | 8/1998 | ................. 369/122 |

* cited by examiner

*Primary Examiner*—Nabil Hindi
(74) *Attorney, Agent, or Firm*—Frommer Lawrence & Haug LLP; William S. Frommer; Darren M. Simon

(57) ABSTRACT

According to the present invention, a semiconductor laser drive device is provided with a high-frequency superimposing circuit to superimpose a high-frequency current on a laser diode and a superimposed frequency changing circuit to change the superimposed frequency and the amplitude of high-frequency current responsive to an operation mode of an optical disk device, wherein the respective superimposed frequency and the amplitude between at least a first output power and a second output power from the semiconductor laser are changed in response to the operation mode of the optical disk device. This not only enables the high-frequency superimposition of a plurality of frequencies and the mode optimization but also facilitates the reduction of laser noises.

16 Claims, 5 Drawing Sheets

SEMICONDUCTOR LASER DRIVE DEVICE, OPTICAL HEAD, OPTICAL DISK DEVICE AND OPTICAL DISK RECORDING AND REPRODUCING METHOD

BACKGROUND OF THE INVENTION

1. Field of the Invention

The present invention relates to optical disk devices for a compact disk (CD) and a digital video disk (DVD), etc. wherein an optical disk capable of either writing once or rewriting many times information by irradiating a laser light thereon is used and an optical disk recording and reproducing method.

2. Description of the Related Art

Semiconductor laser noises are caused by the light reflected from a recording medium when a semiconductor laser is used as a light source for an optical disk drive. As a method of reducing semiconductor laser noises, a method wherein the high-frequency alternating current from a high-frequency current drive circuit is superimposed on the direct current, the superimposed current of which is fed to a semiconductor laser is known.

Conventionally, the semiconductor laser high-frequency superimposition method was carried out when primarily reading the low output laser power information. For example, disclosed in the Japanese Patent laid-open Application No. 5-197994 are a semiconductor noise reduction circuit and optical disk device which are capable of providing stable light sources to the fluctuation of the returned light volume by increasing the high-frequency superimposing volume via a high-frequency superimposing circuit when performing a focus-control by a focus servo system. Also, disclosed in the Japanese Patent laid-open Application No. 3-25732 is a semiconductor laser noise reduction circuit which prevents a current drive circuit from being heated by the amplitude of the high-frequency altering current to be superimposed on the direct current responsive to the detection of errors caused by the increase of noises generated when reproducing information.

Further, disclosed in the Japanese Patent laid-open Application No. 3-97130 is a semiconductor noise reduction circuit wherein noises are reduced by changing the gain from a gain changing amplifier and controlling the superimposed volume of the high-frequency current to be superimposed on the direct current, resulting in providing the modulation suitable for the superimposition thereof. in addition, disclosed in the Japanese Patent laid-open Application No. 4-6635 is an optical information recording and reproducing device wherein noises to be returned to a semiconductor laser are adequately reduced by changing and controlling the laser light pulse lighting frequency so that the returned light noise may be equal to or less than the standard volume. Furthermore, disclosed in the Japanese patent laid-open Application No. 6-52569 is a laser noise reduction device wherein noises can be reduced without causing any effect to the reproduced information signal even if the frequency of the superimposed signal to be fed to a laser diode is low so that the laser diode may be oscillated in a multimode.

The conventional semiconductor laser high-frequency superimposition as described above is a technology wherein amplitude of the high-frequency superimposed current is changed in response to the focus control drawing or the track crossing thereafter or error signals at time of the information reproduction or laser differential quantum efficiency, and the high-frequency superimposed current frequency is changed by the noise volume or clock signals. However, the superimposition technology as described above was not taken into account the time when the information was read or erased by using high power output since the foregoing changes were only made by the low output power at time of information reproduction. This has raised a problem that it is impossible to reduce noises generated at time of recording and erasing information and optimize the laser power to improve the S/N ratio at each operation mode.

SUMMARY OF THE INVENTION

It is, therefore, an object of the present invention to provide a semiconductor laser drive device capable of optimizing the laser power output at each operation mode of an optical disk device, an optical head, an optical disk device and a method of recording and reproducing information using an optical disk.

BRIEF DESCRIPTION OF THE DRAWINGS

FIG. 3 is a waveform illustration showing the operation of a CD-R in an embodiment of the present invention, wherein FIG. 3A is a laser drive signal ILD; FIG. 3B is a read-write signal W/XR; FIG. 3C is a laser drive control signal ODON; FIG. 3D is an enable signal ENABL; FIG. 3E is a mode switching signal CMOD1; FIG. 3F is a mode switching signal CMOD2; and FIG. 3G is a laser power-output signal PLD;

FIG. 4 is a waveform illustration showing the operation of a CD-RW in an embodiment of the present invention, wherein FIG. 4A is a laser drive signal ILD; FIG. 4B is a read-write signal W/XR; FIG. 4C is a laser drive control signal ODON; FIG. 4D is an enable signal ENABL; FIG. 4E is a mode switching signal CMOD1; FIG. 4F is a mode switching signal CMOD2 and FIG. 4G is a laser power output signal PLD.

DETAILED DESCRIPTION OF THE PREFERRED EMBODIMENT

An embodiment of the present invention will now be described in detail below in reference to the accompanying drawings.

An optical disk includes an optical disk for the reproduction only, a write-once optical disk capable of writing only one time and a rewritable optical disk capable of rewriting many times.

Among the optical disks as described above, the embodiment of the present invention is applied to a write-once optical disk capable of writing only one time and an optical disk capable of rewriting information more than a plurality of times. Firstly, a write-once optical disk capable of writing only one time, e.g. a CD-R is roughly described below. The CD-R is designed to form a pit in which information is recorded because the pigment of a pigment record layer is thermally changed by being heated with laser radiation thereto and in which the information is reproduced by irradiating laser light thereto which is obtained by reading as digital signals the reflection ratio changes caused depending on whether or not the record pit is formed. Secondly, a rewritable optical disk capable of rewriting more than a plurality of times, e.g. a CD-RW is roughly described below. The CD-RW is designed to use a phase-change record thin film enabling the phase-change record which is resultant from not only recording and erasing information by causing a phase of the CD-RW structure to be crystallographically heated and changed with the radiation of the laser light to the record thin film but also detecting the reflection ratio changes caused by the optical constant among the phases to reproduce the information.

Figure 1:
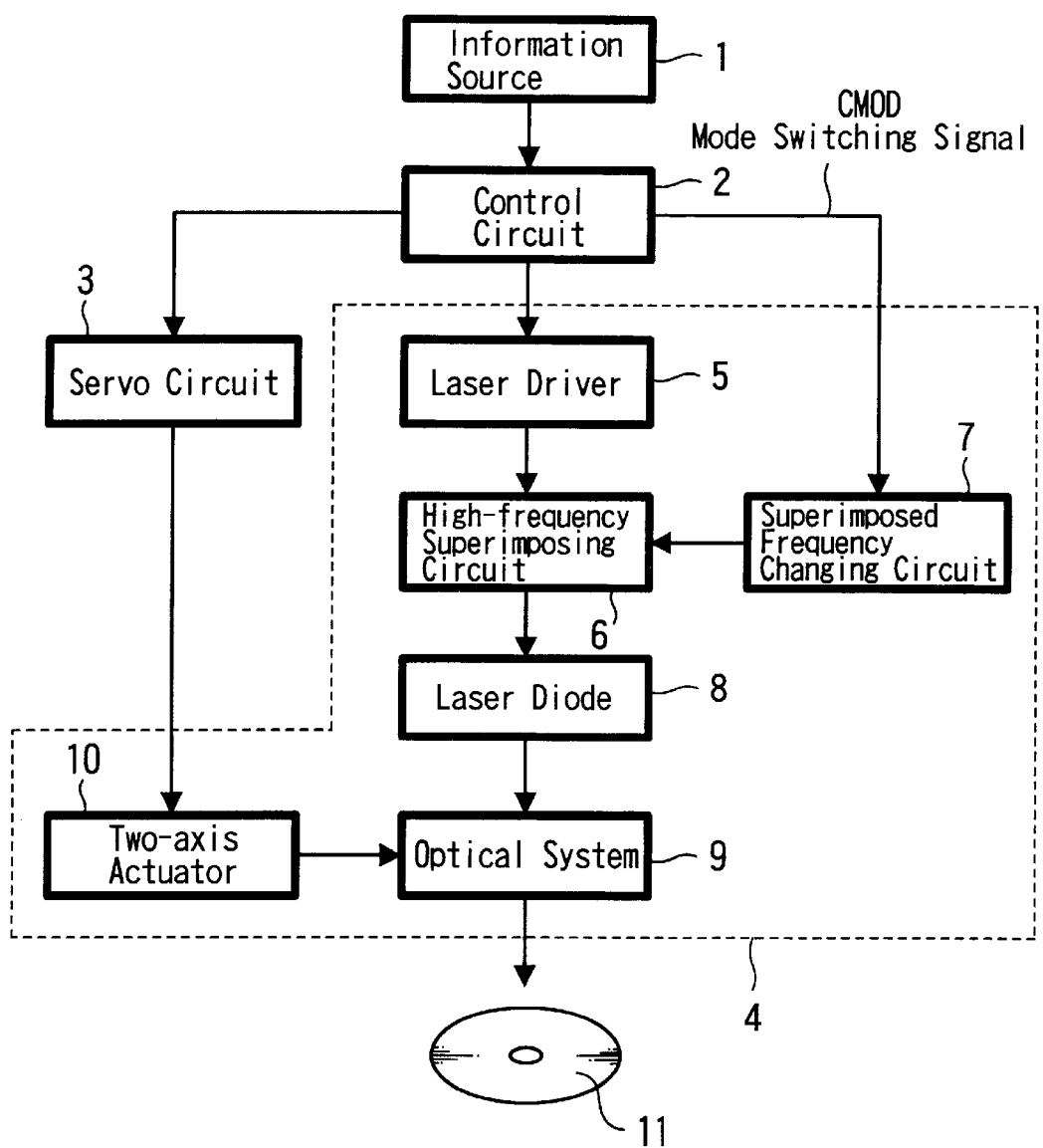
FIG. 1 is a block diagram showing the construction of a semiconductor laser drive device according to an embodiment of the present invention.

FIG. 1 is a block diagram showing the construction of a semiconductor laser drive device for an optical disk record device according to an embodiment of the present invention. The optical disk device disclosed in the present invention records and reproduces the digital data which are output on an optical disk 11 from an information source by laser light radiated from a semiconductor laser. Further, the optical disk device also superimposes on the laser light a high-frequency superimposition signal output from a high-frequency superimposing circuit.

Generally, a guide groove called a pre-groove is formed in advance on a recordable optical disk and the pre-groove is FM-modulated to be slightly meandered. Therefore, a clock signal is generated by demodulating the FM-modulated signal which enables the controlling of a spindle motor via a PLL-servo control.

That is, a spindle motor of the optical disk device not shown in the block diagram 1 is driven to rotate the optical disk 11 so that the spindle motor may be rotated so as to rotate the optical disk 11 at a predetermined rotation number based on the clock signal.

An information signal fed from an information source 1 is processed in a control circuit 2 in such a manner as being recorded and modulated and fed to an optical pick-up 4 as a record signal. An error code generating correction circuit ECC not specifically shown in FIG. 1 receives the digital data output from the information source 11 to which an error correction code is added and then, interleaved to be output as a 8-bit digital signal. Thus, the addition of the error correction code to the recording data enables reading of the correct information even if defects are found on the disk.

A laser driver 5 in the optical pick-up 4 generates predetermined laser drive signals based on record signals at a record mode and at a reproduction mode and feeds the signals to a high-frequency superimposing circuit 6. The high-frequency superimposing circuit 6 superimposes the high-frequency signal from a high-frequency oscillation circuit built therein on the laser drive signal via modulating means. In this step, a superimposed frequency changing circuit 7 generates control signals to change the superimposed frequency in the high-frequency superimposing circuit 6 in response to a mode switching signal CMOD from the control circuit 2 and supplies the control signals to the high-frequency superimposing circuit 6. The high-frequency superimposing circuit 6 changes the frequency and the amplitude of the high-frequency signal to be superimposed on the laser drive signals based on the control signals. In the foregoing high-frequency superimposing step, either frequency or amplitude may be changed.

The laser drive signals on which the high-frequency signals are superimposed are fed to a laser diode 8. The laser diode 8 emits laser light based on the laser light and feeds the light to an optical system 9. A laser for recording information from the laser diode 8 comprises a semiconductor laser and the like, and the laser light is emitted as a laser beam on the optical disk 11. The laser beam is formed as a light ray including the signal components of both high-frequency and information signals at the same time since the beam intensity thereof is changed responsive to the information signal in an information write mode.

A light passageway of the laser light thus generated in the process above is bent by a mirror of the optical system 9 not shown in a FIG. 1 and moved to the optical disk 11, further being collected on the optical disk 11 by an objective lens not shown in FIG. 1. The mirror and objective lens are moved sequentially to the outer circumferential direction of the optical disk 11 synchronized with the rotation of the optical disk 11 via a sled structure not shown in FIG. 1, thereby the laser beam radiation position being changed in sequence to the outer circumferential direction of the optical disk 11.

After the step as described above, a track is scanned in a spiral fashion by the movement of the mirror and objective lens of the optical disk device while the optical disk 11 is driven to be rotated and a laser beam responsive to both signals of the information and high-frequency signals is irradiated on the track. The change of the laser light forwarding direction is recorded as a position transit of the spot on the optical disk on which the light is collected by recording the information after the laser light is passed through the object lens. According to the embodiment as described above, it is possible to change the frequency and amplitude of the high-frequency signal to be superimposed on the information signal responsive to the operation mode and optimize the radiation of the laser light and detection of the reflected light with respect to each laser output power.

In addition, the reflected light from the optical disk 11 of the laser light not shown in FIG. 1 is detected by a photodetector responsive to the reflected light volume therefrom and the detection signal is fed back to the control circuit 2. A servo signal is generated by the control circuit 2 based on the detection signal and fed to a servo circuit 3. Drive signals for a focus coil and tracking coil are generated by the servo circuit 3 based on the servo signal and fed to a two-axis actuator 10. The focus coil and tracking coil are driven by the two-axis actuator 10 based on the drive signals. The step as described above enables the radiation of the laser light on which the high-frequency is superimposed at a desired tracking position and a focus position on the optical disk 11.

More particularly, when recording information on the rewritable optical disk, not only the laser power is driven by the laser driver 5 in advance to be an erase power level but also the information portion not to be recorded is erased and the laser power is adjusted to be the record or write power level so that the information signal may be recorded on the targeted track position. When reproducing the information, the laser power is adjusted to be a read power level by the laser driver 5 and thus the information signal which is recorded on the targeted track position is reproduced.

As a result of the step as described above, the laser light on which high-frequency signals responsive to each mode of record, erase and reproduction are superimposed is irradiated.

After the optical pick-up 4 is located on the targeted track position, the record or reproduction operation is carried out as follows: when reproducing the information, the control circuit 2 supplies or feeds a reproduction command to the laser driver 5. The laser driver 5 adjusts the laser power generation to the reproduction power level to generate a laser drive signal and feeds the laser drive signal to the high-frequency superimposing circuit 6. The high-frequency superimposing circuit 6 superimposes signals fed from the high-frequency oscillation circuit built therein on the laser drive signals via a modulator means. Concurrently with the process above, the superimposed frequency changing circuit 7 controls the superimposed frequency in the high-frequency superimposing circuit 6 responsive to the mode switching signal CMOD from the control circuit 2. Based on the foregoing control, the high-frequency superimposing circuit 6 changes the frequency and amplitude of the high frequency signal to be superimposed on the laser drive signal into a comparatively greater amplitude and comparatively low frequency for the information reproduction. In the foregoing high-frequency superimposing step, either frequency or amplitude may be changed.

The laser drive signal on which the high-frequency signal is superimposed is fed to the laser diode 8. Based on the laser drive signals, the laser diode 8 radiates the laser light on the optical disk 11 via lenses of the optical system 9. With regard to a CD-R, the information is reproduced by reading as a digital signal change of the reflection ratio depending on whether or not there is a pit in which the information is recorded by heating the optical disk with the radiation of the laser light thereto, while, with regard to a CD-RW, the information is reproduced by reading as a digital signal the change of the reflection ratio of a recording mark in which the information is phase-changed and recorded in the state of amorphous.

The photodiode in the optical pick-up 4 senses the laser light reflected by the optical disk 11 on the light sensing surface thereof whose surface is divided into a plurality of portions. The photodiode converts the sensed laser light into an electric signal to be fed to an adder. A plurality of divided signals are added by the adder to generate reproduced RF signals.

The adder feeds the reproduced RF signal to a RF amplifier circuit. The RF amplifier circuit amplifies with high-frequency the reproduced data and feeds the amplified data to a demodulator circuit. Via an EFM, the reproduced data are 8/14 demodulated by the demodulator circuit. The demodulator circuit feeds the demodulated and reproduced data to an ECC decode circuit. The ECC decode circuit corrects errors in the reproduced data via Reed-Solomon product code and outputs the corrected reproduction data. The decoded information signals are fed to a host computer.

When recording the information, the control circuit 2 feeds a record command to the laser driver 5. The record data fed from the host computer is fed to an ECC encode circuit. The ECC encode circuit adds an error correction code to the record data via a Reed-Solomon product code. The ECC encode circuit feeds to a modulator circuit the record data to which the error correction code is added. Via EFM, the recorded data to which the error correction code is added are 8/14 modulated by the modulator circuit. The modulator circuit feeds the modulated record data to the laser driver 5. The laser driver 5 pulse-modulates the 8/14 modulated record data based on the record command to generate write power level laser drive signals and feeds the laser drive signals to the high-frequency superimposing circuit 6. The high-frequency superimposing circuit 6 superimposes the high frequency signals from the high-frequency oscillation circuit built therein on the laser driver signals via a modulating means. In the last step as described above, the superimposed frequency changing circuit 7 controls the superimposed frequency in the high-frequency superimposing circuit 6 in response to the mode switching signal CMOD from the control circuit 2 so that the superimposed frequency may be changed. Based on the control by the superimposed frequency changing circuit 7, the high-frequency superimposing circuit 6 changes the frequency and amplitude of a high-frequency signal to be superimposed on a laser drive signal into a comparatively high frequency and comparatively small amplitude for recording the information. In the step as described above, either frequency or amplitude may be changed.

The laser drive signal on which the high-frequency signal is superimposed is fed to the laser diode 8. Based on the laser drive signals, the laser diode 8 radiates the laser light to the optical disk 11 via lenses of the optical system 9. If the record thin film of the optical disk 11 is heated by the laser light, a pit in which the information is recorded is formed by having the pigment of the pigment record layer heat-changed with the radiation of the laser light thereto with respect to a CD-R, while, with regard to a CD-RW, the record data are recorded on the targeted track position by recording the phase changes in the state of being amorphous caused by fusing and rapidly cooling crystals from the crystal.

Figure 2:
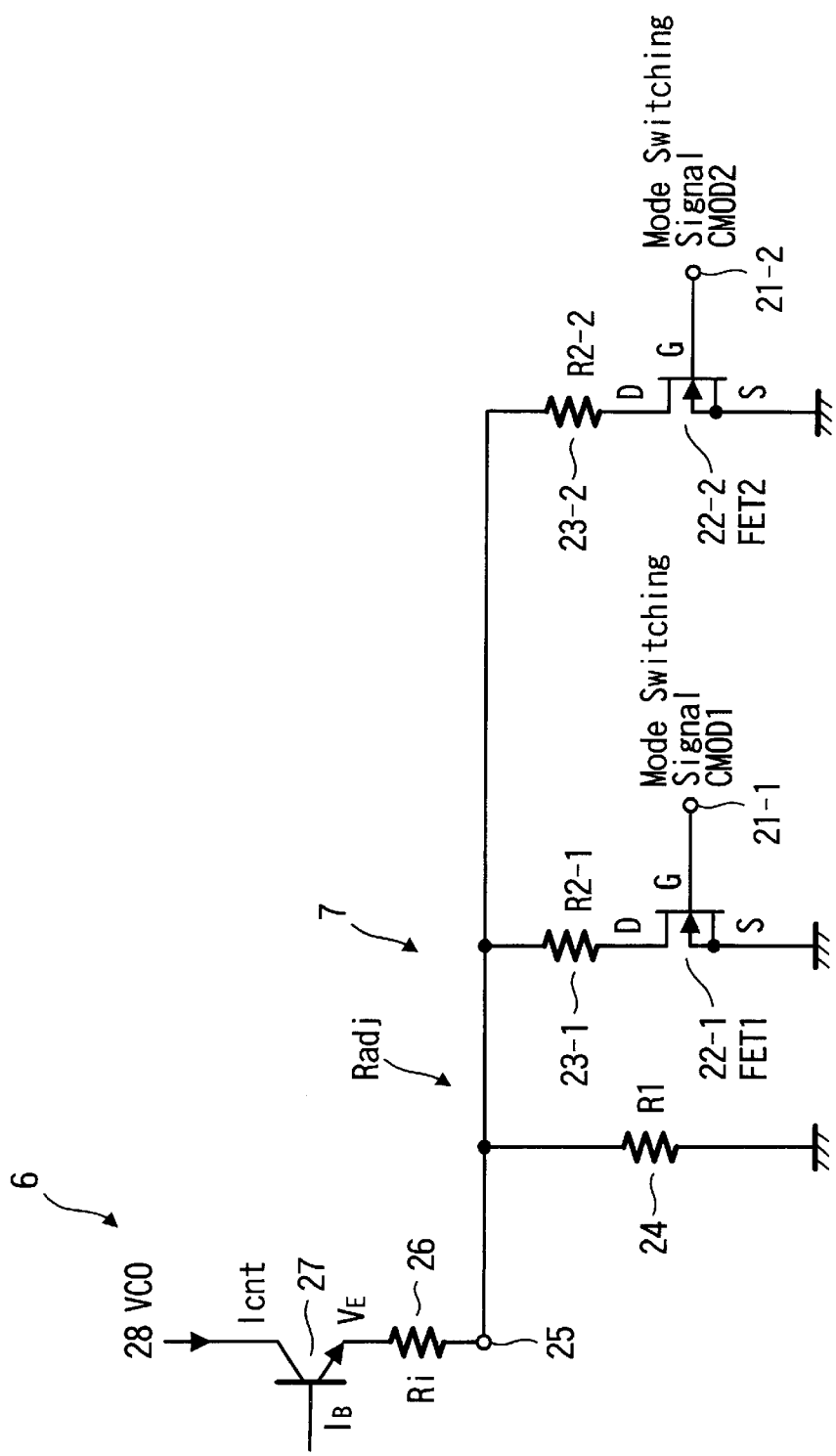
FIG. 2 is a circuit diagram of the superimposed frequency changing circuit in an embodiment of the present invention.

FIG. 2 shows a circuit diagram of the superimposed frequency changing circuit 7 in an embodiment of the present invention.

The superimposed frequency changing circuit 7 shown in FIG. 2 comprises a terminal 25 connected to a transistor 27; a terminal 21-1 to which a mode switching signal CMOD1 is fed; a FET 1 (Field Effect Transistor) in which a gate G is connected to the terminal 21-1, a source S is connected to an earth and a drain D is connected to one end of a resistor (R2-1)23-1; the resistor (R2-1)23-1 the other end of which is connected to the terminal 25; a terminal 21-2 to which a mode switching signal CMOD2 is fed; a FET 2 (Field Effect Transistor) in which a gate G is connected to the terminal 21-2, a source S is connected to an earth and a drain D is connected to one end of a resistor (R2-2)23-2; the resistor (R2-2)23-2 the other end of which is connected to the terminal 25 and a resistor(R1) 24 one end of which is connected to the earth and the other end of which is connected to the terminal 25. In the circuit constitution as described above, the FETs (1) 22-1 and (2) 22-2 are switches to determine whether or not the resistors(R2-1)(23-1) and (R2-2)23-2 are to be connected in parallel to the resistor (R1) 24.

Assuming in the superimposed frequency changing circuit as constituted above that the FET 1 is on when the mode switching signal CMOD1 as a first mode is in a high level H and that the ON-resistance of FET 1 is a resistance component Ron1, a composite resistance Radj comprises the resistor (R1) 24 and a resistance component formed as a result of its parallel connection to the resistance component obtained from the serial connection to the resistance component Ron1 and resistor (R2-1)23-1. Accordingly, the composite resistance Radj is obtained as Radj1=(Ron1+R2-1)·R1/(Ron1+R2-1+R1). Further, the current Icnt of a transistor 27 becomes the first current value ICnt 1 responsive to the composite resistance Radj 1. The same condition as described above is observed when the FET 1 is off and the FET 2 on if the resistance value (R2-1) is equal to the resistance value (R2-2) and the resistance component (Ron1) is equal to the resistance component (Ron2).

Assuming that the FET 1 and FET 2 are both on when the mode switching signals CMOD1 and CMOD2 as a second mode are both in the high level H and that the ON-resistance of FET 2 is a resistance component (Ron2), a composite resistance Radj as constituted above comprises the resistor (R1) 24 and the resistance component obtained from the serial connection to the resistance component (Ron1) and resistor (R2-1)23-1 as well as the resistance component formed as a result of its parallel connection to the resistance component obtained from the serial connection to the resistance component Ron2 and resistor (R2-2) 23-2. Accordingly, the composite resistance Radj is expressed by the formula below: Radj={(Ron1+R2-1)·R1+(Ron1+R2-1)·(Ron2+R2-2)+(Ron2+R2-2)·R1}/(Ron1+R2-1+Ron2+R2-2+R1). The current Icnt of the transistor 27 becomes the second current Icnt2 value in response to the composite resistance Radj2 value.

However, assuming that the resistance value (R2-1) is equal to resistance value (R2-2) and resistance component (Ron1) is equal to resistance component (Ron2), the resistance component resulted from its parallel connection to the resistance component formed by the serial connection to the resistance component (Ron1) and resistor (R2-1) 23-1 and to the resistance component resulted from the serial connection to the resistance component (Ron2) and resistor (R2-2) 23-2 becomes a half value of that in the first mode with respect to the resistance component resulted from the serial connection to the resistance component (Ron1) and the resistor (R2-1)23-1.

Further, the FET 1 and FET 2 are off and released when both mode switching signals CMOD 1 and CMOD 2 as the third mode are in a low level L, thereby a composite resistance Radj being formed in the resistor (R1) 24, resulting in that the composite resistance Radj 3 is equal to RI. And, the current Icnt of transistor 27 at this time becomes the third current Icnt 3.

As described above, the composite resistance Radj value is variable depending on whether the mode switching signals CMOD1 and CMOD2 are in a high level H or low level l and thus, the current Icnt of the transistor 27 is varied between Icnt1 and Icnt3 by switching the mode from the first to the third. This enables the changing of the frequency and amplitude of the high-frequency signal in an oscillation circuit (VCO) 28 using the transistor 27 in the high frequency superimposing circuit 6. In the step as described above, only frequency or only amplitude may be changed. It is further possible to extend the function of the superimposing frequency changing circuit 7 in FIG. 2 wherein built therein are a terminal 21-3 to which a mode switching signal CMOD3 is fed; a FET 3 (Field Effect Transistor) 22-3 in which a gate G is connected to a terminal 21-3, a source S is connected to the earth and a drain D is connected to one end of the resistor (R2-3) 23-3; and the resistor (R2-3) 23-3 the other end of which is connected to the terminal 25 in order to extend the mode to accommodate the mode switching signal CMOD3. It is also possible to provide a control means to change the frequency and amplitude of the high-frequency signal in the oscillation circuit (VCO) 28 by means of other design configurations.

For the purpose as described above, e.g. the oscillation circuit (VCO) 28 for the high-frequency superimposing circuit 6 is to be an oscillator to vary and oscillate a plurality kinds of sine waves at a predetermined frequency. The oscillation frequency f2 of an oscillator B may be an integer multiple of the oscillation frequency f1 of an oscillator A. Further, the oscillation frequency f3 of an oscillator C may be another integer multiple of f1 and the oscillation frequency f4 of an oscillator D may be a further an integer multiple of f1. Also, each oscillation frequency output from each oscillator is amplified by the amplifier circuit to be 1/an integer, 1/another integer and 1/a further integer so that the signal amplitude may be small when the frequency is high. In the step as described above, only frequency or only amplitude may be changed.

Described in detail below are operations with respect to a write-once optical disk capable of writing information only one time and a rewritable optical disk capable of writing information a plurality of times.

A CD-R incorporating a write-once optical disk is now described as an example.

With regard to the CD-R, a pit in which information is recorded is formed by having a pigment of the pigment recording layer thermally changed by heating caused by the laser light being irradiated thereto and a different signal value responsive to a recording pit length is recorded.

Figure 3:
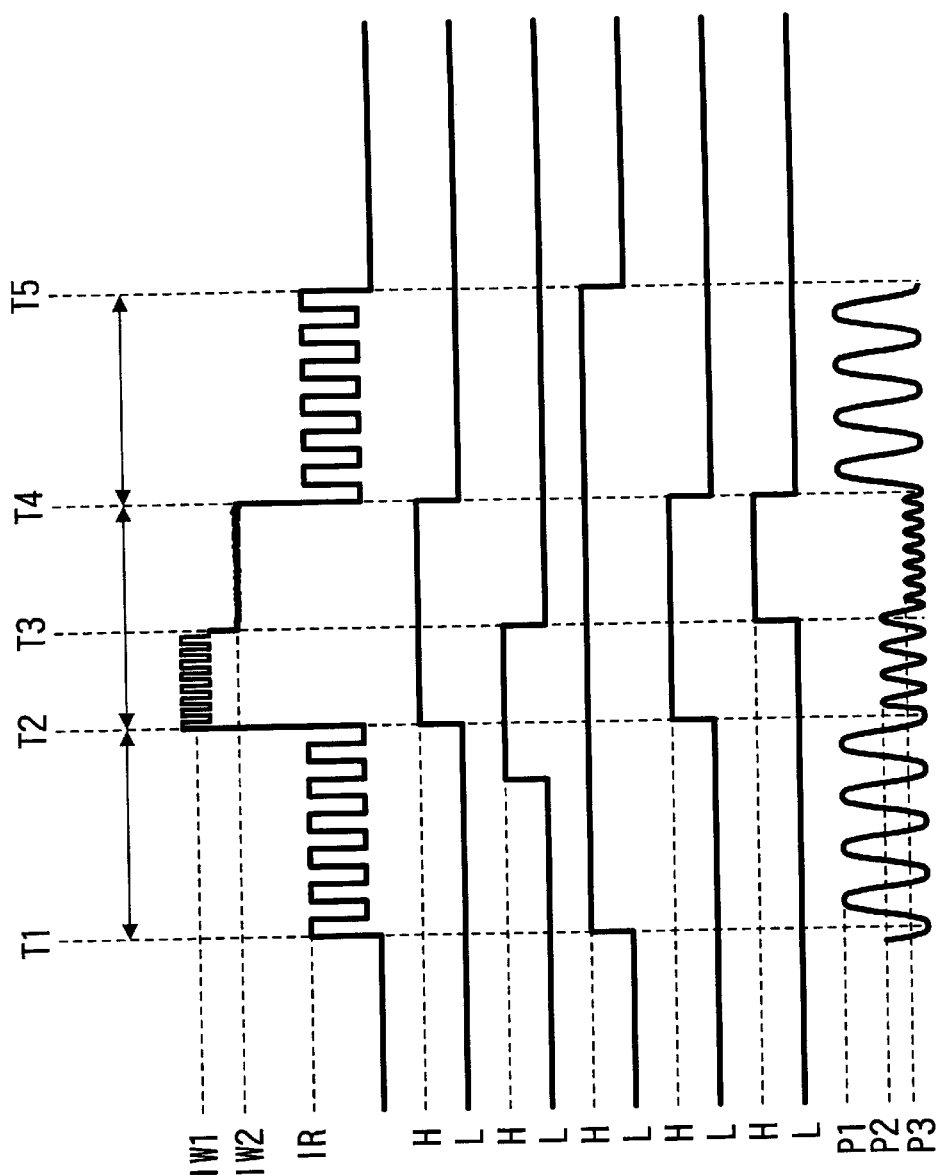

FIG. 3 is a waveform illustration showing the record operation of the CD-R in an embodiment of the present invention.

ILD signals illustrated in FIG. 3A are the laser drive signals whose signal values are shown on a vertical axis and the times on a horizontal axis and which are adjusted to the laser light emitting power including a read power level IR, and write power levels IW1 and IW2 which are output from the laser driver 5. The read power level IR is the power level which is output when a record pit is not formed and is equivalent to the power generated at time of the normal reproduction operation only. The W/XR signal shown in FIG. 3B is the command signal for writing (WRITE: High level H) or reading (READ: Low level L) output from the control circuit 2. An ODON signal shown in FIG. 3C is the control signal which is output from the control circuit 2 to the laser driver 5. An ENBL signal shown in FIG. 3D is the enable signal which is output from the information source 1 to allow the control circuit 2 to operate. The signals CMOD1 and CMOD2 shown in FIG. 3E and FIG. 3F are the mode switching signals to change the frequency and/or amplitude of the high-frequency signal in the oscillation circuit (VCO) 28 via the superimposed frequency changing circuit 7. A PLD shown in FIG. 3G is the high-frequency signal to be superimposed on the laser drive signal which is fed to the laser diode 8 by the high frequency superimposing circuit 6. T1–T2 shows the period in which the laser light with the write power level IR is radiated, while T2–T4 indicates the period in which the write operation to form a pit is carried out and T4–T5 shows the period in which the laser light with the write power level IR is radiated. The embodiment shown in FIG. 3 indicates the period T1–T5 only, but the laser radiation is continuously performed when actually writing the information.

During the period T1–T2 shown in FIG. 3, the mode switching signals CMOD1 and CMOD2 in FIG. 3E and FIG. 3F fed from the superimposed frequency changing circuit 7 in FIG. 2 are both in the low level L. The superimposed frequency changing circuit 7 changes the current Icnt of the transistor 27 into the third current value Icnt3 so that the superimposed frequency in the high-frequency superimposing circuit 6 may be established in response to the low level L mode switching signals CMOD1 and CMOD2. The high-frequency superimposing circuit 6 changes the frequency and/or amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 3G becomes the comparatively high frequency F1 and comparatively large amplitude P1. The high-frequency superimposition operation during the period T1–T2 corresponds to the third mode.

During the period T2–T3, the mode switching signal CMOD1 in FIG 3E is in the high level H and the mode switching signal CMOD2 in FIG. 3F is in the low level L. The superimposed frequency changing circuit 7 changes the current Icnt of the transistor 27 into the first current value Icnt so that the superimposed frequency in the high-frequency superimposing circuit 6 may be established. The high-frequency superimposing circuit 6 changes the high-frequency and amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 3G becomes the comparatively medium frequency F2(F2>F1) and amplitude P2(P2<P1) which is comparatively smaller than Pland medium. The high-frequency superimposition operation during the period T2–T3 corresponds to the first mode.

During the period T3–T4, the mode switching signals CMOD1 and CMOD2 in FIG. 3E and FIG. 3F are both in the high level H. The superimposed frequency changing circuit 7 changes the current Icnt of the transistor 27 into the second current value Icnt2 so that the superimposed frequency in the high-frequency superimposing circuit 6 may be established in response to the high level H mode switching signals CMOD1 and CMOD2. The high-frequency superimposing circuit 6 changes the frequency and amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 3G becomes the comparatively high frequency F3(F3>F2>F1) and amplitude P3(P3<P2<P1)which is comparatively smaller than P1. The high-frequency superimposition operation during the period T3–T4 corresponds to the second mode.

During the period T4–T5, the mode switching signals CMOD1 and CMOD2 in FIG. 3E and FIG. 3F fed from the superimposed frequency changing circuit 7 shown in FIG. 2 are both in the low level L. The superimposed frequency changing circuit 7 changes the current Icnt of the transistor 27 into the third current value Icnt3 so that the superimposed frequency in the high-frequency superimposing circuit 6 may be established in response to the low level L mode switching signals CMOD1 and CMOD2. The high-frequency superimposing circuit 6 changes the frequency and amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 3G becomes the comparatively low frequency F1 and comparatively large amplitude P1. The high-frequency superimposition operation during the period T4–T5 corresponds to the third mode.

The reason why the IDL signal in FIG. 3A is switched to the laser light emitting power with a comparatively high write power level IW1 and comparatively medium write power level IW2 during the periods T2–T3 and T3–T4 is that it is required according to a standard that during the first part of the information recording, a pit in which the information is recorded be formed in the condition where the pigment of the pigment recorded layer is liable to be heat-changed by the heating temperature increase with the radiation of the laser light thereto and the recording be made stable during the latter part thereof in order to improve the CD-R recording characteristics.

During the period T2–T3, the frequency signal with the comparatively medium frequency F2 and comparatively medium amplitude P2 shown in FIG. 3G is superimposed on the ILD signal in FIG. 3A, but it is required that the laser power output peak value generated after the superimposition thereof be lower than the allowable laser power peak value in order to prevent the laser diode from being broken. Accordingly, if the allowable peak value is low depending on the types of laser diodes, the high-frequency signal with comparatively high frequency F3 and comparatively small amplitude P3 in FIG. 3G may be superimposed on the ILD signal in FIG. 3A during the period T2–T3 like the period T3–T4. If the laser power output is within the allowable peak value, only amplitude may be changed with frequency unchanged. Likewise, if within the allowable peak value, the high-frequency signal with the comparatively high frequency F3 and comparatively small amplitude P3 may be superimposed on the ILD signal during the period T2–T3, and further, the high-frequency signal with the comparatively medium frequency F2 and comparatively medium amplitude P2 may be superimposed thereon during the period T3–T4.

Next, the operation of a CD-RW incorporating a rewritable optical disk is described, as an example.

Firstly, a principle of the phase-change recording is described below.

Generally, a phase-change disk is in the state of being crystallized in its initial state the disk is used. The information recording is carried out by changing the disk from the crystallized state into the amorphous state, while the information erase is effected by modifying the disk from the amorphous state into the crystallized state. More particularly, when recording the information, the temperature of the record thin film for the optical disk is risen up to its melting point by radiating the laser beam with the write power thereto and rapidly cooling the record film to drop the temperature thereof, resulting in making the disk to be amorphous. Further, the amorphous optical disk is returned to the crystallized state by a method wherein when erasing the information, the temperature of the optical disk record film thereof is risen up to the melting point by radiating the erase laser beam with the erase power thereto or the cooling speed thereof is reduced so that the thin film may be uncooled or the thin film temperature is maintained over the temperature to make the film amorphous for a certain period of time. More specifically, crystallizing of the substance in the state where the temperature is risen over the melting point is called "melt crystallization" or "liquid-phase crystallization" and crystallizing of the substance in the state of being supercooled, "solid-phase crystallization".

Using the record thin film, the information write and erase are performed by radiating laser light to the record thin film to be heated and having the structure thereof crystallographically phase-changed and the information reproduction is made by detecting the reflection ratio changes caused by optical constant changes between the phases thereof.

The amorphous state as described above is obtained by heating the record thin film over the melting point with the laser light radiation thereto and rapidly cooling the heated and fused thin film. The crystallized state of the thin film is obtained by heating the thin film below the melting point and over the crystallizing temperature with laser light radiation thereto.

Since the amorphous state of the thin film is obtained by fusion and rapid cooling thereof, it is possible to reduce the time within the allowable range of the laser radiations power, but the time for crystallization thereof subject to material physical properties is necessary as the state of being crystallized is the realignment of atoms. That is, it is required that materials used for a phase-change disk be not only stable in its amorphous state but also crystallized in a short period of time.

A laser power is modulated between the write (the state of being amorphous) power and erase (crystallization) power by adequately accelerating the crystallization of the thin film or making the crystallization time shorter or crystallizing the thin film within the time a laser beam passes. This enables the over-write operation with a single beam to write the new data, while erasing the data recorded with the beam.

If the new data are recorded by using the laser light which is pulse-modulated on the track on which the data is recorded, the portion to which the write power is radiated is melted and rapidly cooled irrespective of the previous state thereof and thus, becomes the state of being amorphous and further, the portion to which the erase power is radiated becomes crystallized likewise irrespective of the previous state thereof. It is, thus, possible to over-write and record the new data with one time laser light radiation thereto while erasing the previous data. Accordingly, both erase (ERASE) and write(WRITE) are carried out during the write operation period.

Described below is the over-write in the phase-change of CD-RW in an embodiment of the present invention with reference to FIG. 4.

Figure 4:
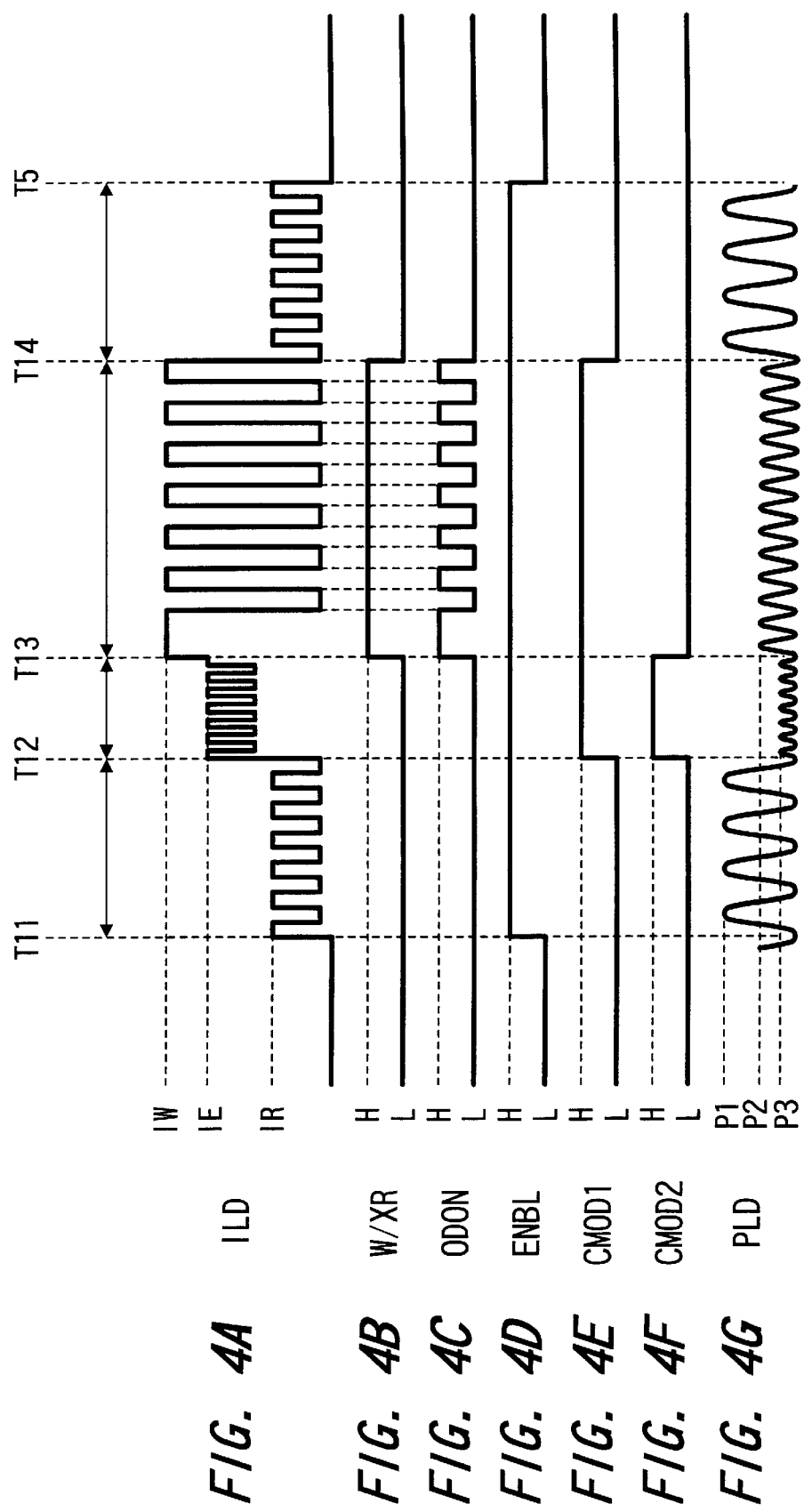

FIG. 4 is a waveform illustration showing the operation of a CD-RW in an embodiment of the present invention.

ILD signals illustrated in FIG. 4A are the laser drive signals whose signal values are shown on a vertical axis and the times are shown on a horizontal axis and which are adjusted to the laser light emitting power including a read power level IR, an erase power level IE and a write power level IW which are output from the laser driver 5. A W/XR signal in FIG. 4B is the command signal for write (WRITE: high level H) or read (READ: low level L) which is output from the control circuit 2. The read power level IR is the power level which is output when a write pit is not formed or when a pit in which information is recorded is not erased and which is equal to the laser power generated at time of the normal reproduction operation only. An ODON signal shown in FIG. 4c is the control signal which is output from the control circuit 2 to the laser driver 5. An ENBL signal shown in FIG. 4D is the enable signal output from the information source 1 to allow the control circuit 2 to operate. Signals CMOD1 and CMOD2 shown in FIG. 4E and FIG. 4F are the mode switching signals to change the frequency and amplitude of the high-frequency signal in the oscillation circuit (VCO) 28 via the superimposed frequency changing circuit 7. A PLD shown in FIG. 4G is the high-frequency signal to be superimposed on the laser drive signal which is fed to the laser diode 8 by the high frequency superimposing circuit 6. T11–T12 shows the period during which the laser light with the write power level IR is radiated; T12–T13 shows the period during which the laser light with the write power level IE is radiated; T13 and T14 shows the period during which the laser light with the write power level IR is radiated; and T14–T15 shows the period during which the laser light with the write power level IR is radiated. According to the embodiment shown in FIG. 4, the operation covering the period T11–T15 is illustrated to be continuously performed, but when actually recording the information, the recording is carried out by repeating the period T12–T13. In addition, T11–T12 and T14–T15 show the period during which the normal reproduction operations are being conducted. However, to facilitate the comparison of the conditions in respective operations, the periods concerned are shown as if the operations were continuously performed.

During the period T11–T12 shown in FIG. 4, the mode switching signals CMOD1 and CMOD2 shown in FIG. 3E and FIG. 3F fed from the superimposed frequency changing circuit 7 shown in FIG. 2 are both in the low level L. The superimposed frequency changing circuit 7 changes the current Icnt of the transistor 27 into the third current value Icnt3 so that the superimposed frequency in the high-frequency superimposing circuit 6 may be established in response to the low level L mode switching signals CMOD1 and CMOD2. The high-frequency superimposing circuit 6 changes the frequency and/or amplitude of the high-frequency signal to be superimposed on the laser drive signal based on the current Icnt. The laser drive signal on which the high-frequency signal is superimposed is fed to the laser diode 8. The laser diode 8 emits the laser light responsive to the laser drive signal on which the high-frequency signal is superimposed and feeds the laser light to the optical system 9. In the last step as described above, the high-frequency signal as shown in FIG. 4G becomes the comparatively low frequency F10 and comparatively large amplitude P10. The high-frequency superimposition operation during the period T11–T12 corresponds to the third mode mentioned before.

During the period T12–T13, the mode switching signals CMOD1 and CMOD2 shown in FIG. 4E and FIG. 4F are both in the high level L. The superimposed frequency changing circuit 7 changes the current Icnt of the transistor 27 into the second current value Icnt2 so that the superimposed frequency in the high-frequency superimposing circuit 6 may be established in response to the high level H mode switching signals CMOD1 and CMOD2. The high-frequency superimposing circuit 6 changes the frequency and/or amplitude of the high-frequency signal to be superimposed on the laser drive signal based on the current Icnt. The laser drive signal on which the high-frequency signal is superimposed is fed to the laser diode 8. The laser diode 8 emits the laser light responsive to the laser drive signal on which the high-frequency signal is superimposed and feeds the laser light to the optical system 9. In the last step as described above, the high-frequency signal as shown in FIG. 4G becomes the frequency F30(F30>F10)which is comparatively higher than F10 and amplitude P30(P30<P10) which is comparatively smaller than P10. The high-frequency superimposition operation during the period T12–T13 corresponds to the second mode mentioned before.

During the period T13–T14, the mode switching signal CMOD1 in FIG. 4E is in the high level H and the mode switching signal CMOD2 in FIG. 4F is in the low level L. The superimposed frequency changing circuit 7 changes the current Icnt of the transistor 27 into the first current value Icnt1 so that the superimposed frequency in the high-frequency superimposing circuit 6 may be established in response to the high level H mode switching signal CMOD1. The high-frequency superimposing circuit 6 changes the frequency and/or amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 4G becomes the comparatively medium frequency F20(F30>F20>F10)and comparatively medium amplitude P20(P30<P20<P10). The high-frequency superimposition operation during the period T13–T14 corresponds to the first mode described before.

During the period T14–15, the mode switching signals CMOD1 and CMOD2 shown in FIG. 4E and FIG. 4F fed from the superimposed frequency changing circuit 7 shown in FIG. 2 are both in the low level L. The superimposed frequency changing circuit 7 changes the current Icnt of the transistor 27 into the third current value Icnt3 so that the superimposed frequency in the high-frequency superimposing circuit 6 may be established in response to the low level L mode switching signals CMOD1 and CMOD2. The high-frequency superimposing circuit 6 changes the frequency and/or amplitude of the high-frequency signal to be superimposed on the laser drive signal based on the current Icnt. The laser drive signal on which the high-frequency signal is superimposed is fed to the laser diode 8. The laser diode 8 radiates the laser light responsive to the laser drive signal on which the high-frequency signal is superimposed and feeds the laser light to the optical system 9. In the last step as described above, the high-frequency signal as shown in FIG. 4G becomes the comparatively low frequency F10 is and comparatively large amplitude P10. The high-frequency superimposition operation during the period T14–T15 corresponds to the third mode mentioned before.

During the period T12–T13, the frequency signal with the comparatively high-frequency and comparatively small amplitude P30 shown in FIG. 4G is superimposed on the ILD signal shown in FIG. 4A, but it is required that the laser power output peak value generated after the superimposition thereof be adequately lower than the record power IW value. This is because there is a possibility that laser power equal to write power IW is generated and a pit may erroneously be formed if amplitude is great. Accordingly, if the difference between the value of the erase power IE and that of the record power IW is great, the high-frequency with the comparatively medium frequency and comparatively medium amplitude P20 shown in FIG. 4G may be superimposed on the ILD signal in FIG. 4A during the period T12–T13 like the period T13–T14. Also, if the laser power output is within the allowable peak value of the record power IW, only amplitude may be changed with frequency unchanged. Likewise, if within the allowable peak value of the record power IW, the high-frequency with the comparatively medium frequency F20 and comparatively medium amplitude P20 shown may be used for the frequency signal superimposition during the period T12–T13 and the high-frequency signal with the comparatively high frequency F30 and comparatively small amplitude P30 may also be used during the period T13–T14.

It is required that when using the record power IW enabling the record operation with a high level output, the laser power output peak value be lower than the allowable laser power peak value since a light pulse is PWM-modulated. To this end, it is now disclosed in the present invention that the amplitude F20 of the high-frequency signal to be superimposed when generating a record power IW is established so that the amplitude may be smaller than that to be formed when generating the read power IR.

Figure 5:
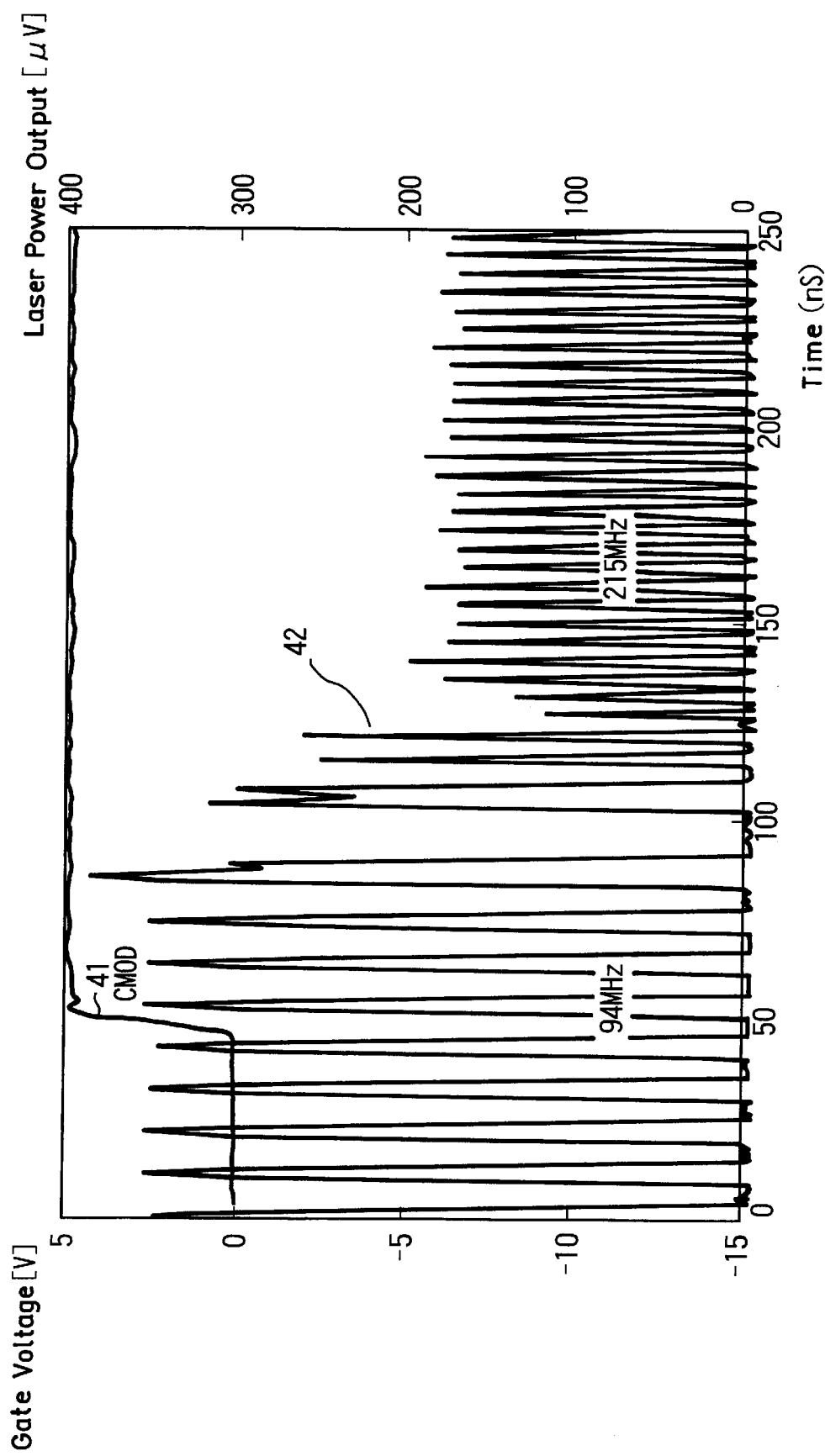
FIG. 5 is a detailed waveform illustration showing the operation of an embodiment of the present invention.

FIG. 5 is a practical waveform illustration showing the operation in an embodiment of the present invention. FIG. 5 is a magnified illustration showing an example of the mode switching points with respect to the mode switching signals CMOD1 and CMOD2 and the current Icnt shown in FIG. 2. In FIG. 5, when the gate voltage of the FET 22 for a mode switching signal CMOD41 in FIG. 2 is 0 volt and in a low level, frequency and amplitude of a high-frequency signal 42 are 94 MHz and 350 $\mu$V respectively. In addition, when the gate voltage of FET 22 for the mode switching signal CMOD41 in FIG. 2 is 5 volt and in a high level, the frequency and amplitude of the laser power output signal 42 are 215 MHz and 180 $\mu$V respectively. In the case as described above, a comparatively low frequency is 94 MHz and a comparatively large amplitude is 350 $\mu$V. Further, a comparatively high frequency is 215 MHz and a comparatively small amplitude is 180 $\mu$V. A medium frequency and a medium amplitude become the intermediate values thereof respectively.

For example, when the operation of the CD-R is the the period T2–T3 shown in FIG. 3, the CMOD1 for the mode switching signal CMOD41 may be used as the high level output H and the CMOD2 is the low level L and the high-frequency signal 42 is as the medium frequency and amplitude signal mentioned above. Further, when the operation of CD-R is in the period T3–T4, both CMOD1 and CMOD2 for the mode switching signal 41 may be used as high level H and the high-frequency signal 42 may be a signal wigh a comparatively high frequency and comparatively small amplitude. Thus, CD-R laser noises can easily be reduced by conducting the optimized frequency superimposition responsive to the mode for the periods T2–T3 and T3–T4 out of the period T2–T4. As described above, it is possible to stably drive the laser diode since the optimum amplitude adapted to each mode is predetermined and the laser drive signal to radiate the laser light with laser power output exceeding the allowable peak value is thus not input to the laser diode.

For example, when the operation of the CD-RW is in the period T12–T13 shown in FIG. 4, both signals CMOD1 and CMOD2 for the mode switching signal CMOD41 may be used as the high level output H and the high-frequency signal 42 is made as the comparatively high frequency and comparatively small amplitude outputs mentioned above. Further, when the operation of the CD-RW is in the period T13–T14, the CMOD1 for the mode switching signal 41 may be used as the high level output H and its CMOD2 is as the low level output L and the high frequency signal 42 with the comparatively medium frequency and a medium amplitude mentioned above is made during the period T13–T14. Thus, CD-RW laser noises can easily be reduced by conducting the optimized frequency superimposition responsive to the erase mode for the period T12–T13 and the record mode for the period T13–T14 out of the period T12–T14. As described above, it is possible to stably drive a laser diode since the optimum amplitude adapted to each mode is predetermined and the laser drive signal to radiate the laser light with laser power output exceeding the allowable peak value is thus not input to the laser diode.

Further to the foregoing, it is possible to carry out the record operation since a plurality of amplitude setting modes can be switched and used when conducting the record operation without erroneously forming a pit when erasing the information.

As described above, it is possible, according to the present intention, to superimpose a high-frequency signal with optimized frequency and/or amplitude on a laser drive signal when recording information in addition to the superimposition of the high frequency signal on the laser drive signal when reproducing information using a common high-frequency superimposing circuit.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A semiconductor laser drive device to drive a semiconductor laser for an optical disk device which records and reads information by irradiating a laser light from the semiconductor laser on an optical recording medium comprising:

a laser drive for supplying to the semiconductor laser a drive signal responsive to an operation mode of the optical disk device;

a high-frequency superimposing means for superimposing a high frequency signal on the drive signal; and a superimposed high-frequency signal changing means for changing a frequency and an amplitude of the high frequency signal responsive to said operation mode of the optical disk device; the superimposed high-frequency signal changing means changing the frequency and amplitude of the high-frequency signal into a first frequency and a first amplitude when the optical disk device is in an information record operation mode, and a second frequency lower than the first frequency and a second amplitude greater than the first amplitude when in an information read operation mode.

2. The semiconductor laser drive as claimed in claim 1, wherein the laser power supplied by the laser driver in the information record operation mode is greater than the laser power in the information read operation mode.

3. The semiconductor laser drive as claimed in claim 1, wherein when in an information erase operation mode, the superimposed high-frequency signal changing means changes the frequency and the amplitude of the high-frequency signal into a third frequency higher than the first frequency and a third amplitude greater than the first amplitude.

4. The semiconductor laser drive as claimed in claim 3, wherein the laser power supplied by the laser driver in the information record operation mode is greater than the laser power in the information read operation mode.

5. The semiconductor laser drive as claimed in claim 4, wherein the laser power supplied by the laser driver in the information erase operation mode is between the laser power in the information record operation mode and the laser power in the information read operation mode.

6. The semiconductor laser drive as claimed in claim 1, wherein the superimposed high-frequency signal changing means changes the frequency and the amplitude of a high-frequency current by switching a current supplied to the high-frequency superimposing means.

7. An optical head which records and reads information by irradiating a laser light from a semiconductor laser on an optical disk comprising:

a semiconductor laser for emitting a laser light;

an optical means for irradiating the laser light on the optical disk;

a laser driver for supplying to the semiconductor laser a drive signal responsive to an operation mode of an optical disk device;

a high-frequency superimposing means for superimposing a high-frequency signal on the drive signal; and a superimposed high-frequency signal changing means for changing a frequency and an amplitude of a high-frequency signal responsive to said operation mode in the optical disk device; the superimposed high-frequency signal changing means changing the frequency and amplitude of the high-frequency signal into a first frequency and a first amplitude when the optical disk device is in an information record operation mode, and a second frequency lower than the first frequency and a second amplitude greater than the first amplitude when in an information read operation mode.

8. The optical head as claimed in claim 7, herein the laser power supplied by the laser driver in the information record operation mode is greater than the laser power in the information read operation mode.

9. The optical head as claimed in claim 7, wherein in an information erase operation mode, the superimposed high-frequency signal changing means changes the frequency and the amplitude of the high-frequency signal into a third frequency higher than the first frequency and a third amplitude smaller than the first amplitude.

10. The optical head as claimed in claim 9, wherein the laser power supplied by the laser driver in the information record operation mode is greater than the laser power in the information read operation mode and the laser power in an information erase operation mode is between the laser power in the information record operation mode and the laser power in the information read operation mode.

11. The optical head as claimed in claim 7, wherein the superimposed high-frequency signal changing means changes the frequency and the amplitude of the high-frequency current by switching a current supplied to the high-frequency superimposing means.

12. An optical disk device which records and reads information by irradiating a laser light from a semiconductor laser on an optical disk comprising:

a semiconductor laser for emitting a laser light;

an optical means for irradiating the laser light on the optical disk;

a driving means for rotating the optical disk;

a laser driver for supplying to the semiconductor laser a drive signal responsive to an operation mode of the optical disk device;

a high-frequency superimposing means for superimposing a high-frequency signal on the drive signal; and a superimposed high-frequency signal changing means for changing a frequency and an amplitude of the high frequency signal responsive to said operation mode in the optical disk device; the superimposed high-frequency signal changing means changing the frequency and amplitude of the high-frequency signal into a first frequency and a first amplitude when the optical disk device is in an information record operation mode, and a second frequency lower than the first frequency and a second amplitude greater than the first amplitude when in an information read operation mode.

13. The optical disk device as claimed in claim 12, wherein the laser power supplied by the laser driver in the information record operation mode is greater than the laser power in the information read operation mode.

14. The optical disk device as claimed in claim 12, wherein in an information erase operation mode, the superimposed high-frequency signal changing means changes the frequency and the amplitude of the high-frequency signal into a third frequency higher than the first frequency and a third amplitude smaller than the first amplitude.

15. The optical disk device as claimed in claim 12, wherein the laser power supplied by the laser driver in the information record operation mode is greater than the laser power in the information read operation mode and the laser power in an information erase operation mode is between the laser power in the information record operation mode and the laser power in the information read operation mode.

16. An optical disk recording and reproducing method by radiating a laser light from a semiconductor laser on the surface of an optical disk comprising the steps of:

superimposing a high-frequency signal on the semiconductor laser; and changing a frequency and an amplitude of the high-frequency signal in the high-frequency superimposition step responsive to an operation mode in the optical disk recording and reproducing method; wherein in an information record operation mode, a superimposed high-frequency signal changing means changes the frequency and the amplitude of the high-frequency signal into a first frequency and a first amplitude and in an information read operation mode, a superimposed high-frequency signal changing means changes the frequency and the amplitude of the high-frequency signal into a second frequency lower than the first frequency and a second amplitude greater than the first amplitude.

* * * * *